United States Patent
Hinds et al.

(10) Patent No.: US 11,898,904 B2
(45) Date of Patent: Feb. 13, 2024

(54) WEARABLE LASER DETECTION SYSTEMS HAVING COLLOIDAL QUANTUM DOT SENSOR ARRAYS THEREIN

(71) Applicant: SWIR Vision Systems Inc., Durham, NC (US)

(72) Inventors: Sean Hinds, Ottawa (CA); Ethan J. D. Klem, Chapel Hill, NC (US)

(73) Assignee: SWIR Visions Systems Inc., Durham, NC (US)

( * ) Notice: Subject to any disclaimer, the term of this patent is extended or adjusted under 35 U.S.C. 154(b) by 113 days.

(21) Appl. No.: 17/725,605

(22) Filed: Apr. 21, 2022

(65) Prior Publication Data

US 2023/0071509 A1  Mar. 9, 2023

Related U.S. Application Data (60) Provisional application No. 63/178,172, filed on Apr. 22, 2021.

(51) Int. Cl.
*G01J 1/42* (2006.01)
*G01J 1/04* (2006.01)

(52) U.S. Cl.
CPC ............. *G01J 1/42* (2013.01); *G01J 1/0411* (2013.01); *G01J 1/0488* (2013.01)

(58) Field of Classification Search
None
See application file for complete search history.

(56) References Cited

U.S. PATENT DOCUMENTS

| 5,025,148 A | 6/1991 | Poisel |
| 2010/0142328 A1 | 6/2010 | Beck et al. |
| 2014/0192367 A1 | 7/2014 | Jungwirth |
| 2018/0138330 A1 | 5/2018 | Choi |

FOREIGN PATENT DOCUMENTS

CN  210224047 U  3/2020

OTHER PUBLICATIONS

Notification of Transmittal of the International Search Report and the Written Opinion of the International Searching Authority, or the Declaration, PCT/US2022/025672, dated Aug. 9, 2022.
J. Dubois and F. Reid, Detecting laser sources on the battlefield (Photonics North 2007). SPIE, 2007.

(Continued)

*Primary Examiner* — Marcus H Taningco
(74) *Attorney, Agent, or Firm* — Stanek Lemon Crouse & Meeks, PA (57) ABSTRACT

Laser warning systems are provided for providing an alert when exposure to laser light sources is detected. The system includes a colloidal quantum dot detector module including a colloidal quantum dot photodetector and a processor coupled to the colloidal quantum dot detector module. The system detects interference patterns generated in the colloidal quantum dot detector module by light illuminating the laser warning system and determines if the light illuminating the laser warning systems is laser light based on a magnitude of interference infringes generated by the light illuminating the laser warning system.

17 Claims, 10 Drawing Sheets

(56) References Cited

OTHER PUBLICATIONS

E. Klem, C. Gregory, G. Cunningham, S. Hall, D. Temple, and J. Lewis, "Planar PbS quantum dot/C60 heterojunction photovoltaic devices with 5.2% power conversion efficiency," Applied Physics Letters, vol. 100, No. 17, p. 173109, 2012.
Y. Liu et al., "Buckled Topography to Enhance Light Absorption in Thin Film Organic Photovoltaics Comprising CuPc/C60 Bilayer Laminates," Zeitschrift fur Physikalische Chemie, vol. 229, No. 7-8, pp. 1251-1261, 2015.
E. J. Klem, L. Levina, and E. H. Sargent, "PbS quantum dot electroabsorption modulation across the extended communications band 1200-1700 nm," Applied Physics Letters, vol. 87, No. 5, p. 053101, 2005.
E. J. Klem, J. Lewis, C. Gregory, D. Temple, P. S. Wijewarnasuriya, and N. Dhar, "Low-cost SWIR sensors: advancing the performance of ROIC-integrated colloidal quantum dot photodiode arrays," in Infrared Technology and Applications XL, 2014, vol. 9070: International Society for Optics and Photonics, p. 907039.
E. J. Klem, C. Gregory, D. Temple, and J. Lewis, "PbS colloidal quantum dot photodiodes for low-cost SWIR sensing," in Infrared Technology and Applications XLI, 2015, vol. 9451: International Society for Optics and Photonics, p. 945104.
D. Benton, "Low-cost detection of lasers," Optical Engineering, vol. 56, No. 11, p. 114104, 2017.

WEARABLE LASER DETECTION SYSTEMS HAVING COLLOIDAL QUANTUM DOT SENSOR ARRAYS THEREIN

CLAIM OF PRIORITY

The present application claims the benefit of and priority to U.S. Patent Provisional Application Ser. No. 63/178,172 filed on Apr. 22, 2021, entitled WEARABLE LASER DETECTION AND ALERT SYSTEM USING COLLOIDAL QUANTUM DOT SENSOR ARRAYS, the contents of which are hereby incorporated herein by reference as if set forth in its entirety.

FIELD

The present inventive concept relates generally to laser detection and, more particularly, laser detection systems utilizing thin-film photodiode array technology.

BACKGROUND

There is a need for portable, low-cost detection systems capable of detecting when a person or an object is being illuminated by laser light. These systems are needed to, for example, provide warnings to people to avoid potential imminent bodily threats and reduce the likelihood of equipment damage. It is well known that exposure to lasers may cause damage to the human body, for example, eyes, and/or sensitive EO/infrared (IR) sensors and systems.

One of the defining characteristics of laser sources is a phase coherence of emitted photons. Phase coherence is used by detection systems to distinguish a laser source from other non-laser optical sources. For example, coherence detection may be achieved by superposition of optical or optically-generated signals. For example, the phase coherence of incident light may be determined by the autocorrelation of the incident optical signal with itself via optical delay elements. By way of further example, a local oscillator signal may be combined with the output of a photodetector to detect a laser-pulse train contained within an unmodulated optical background. Other architectures for coherence detectors include, for example, Michelson interferometers, Fabry-Perot filters (etalons), Fizeau interferometers, wavelength-dependent beam splitters coupled to matched detectors, Fresnel doubles, Lloyd's prisms, and speckle detection systems. Although these approaches can be effective for coherence detection, conventional commercial systems implementing these various approaches do not generally have the size and cost scalability that is needed for a wearable laser detection and alert system (LDAS). Thus, improved systems are desired.

SUMMARY

Some embodiments of the present inventive concept provide laser warning systems for providing an alert when exposure to laser light sources is detected. The system includes a colloidal quantum dot detector module including a colloidal quantum dot photodetector and a processor coupled to the colloidal quantum dot detector module. The system detects interference patterns generated in the colloidal quantum dot detector module by light illuminating the laser warning system and determines if the light illuminating the laser warning systems is laser light based on a magnitude of interference infringes generated by the light illuminating the laser warning system.

In further embodiments the processor may be further configured to distinguish the laser light from non-laser background optical conditions.

In still further embodiments, if it is determined that the light illuminating the laser warning system is laser light indicating a laser illumination event, the system may be further configured to generate a warning, wherein the warning is an audible alert and/or a visual alert.

In further embodiments, the laser light may include light having a wavelength of from about 450 to about 2400 nm.

In still further embodiments, the laser warning system may further include a lens and optical filter components to provide a 2-Pi steradian field of view (FOV).

In some embodiments, the laser warning system may provide a detection threshold of <500 $mW/cm^2$ in presence of background illumination; a wavelength sensitivity of from about 450 nm to about 2400 nm; a field of view of 2 pi steradians.

In further embodiments, the system may be wearable.

In still further embodiments, the laser warning system may further includes an enclosure, the colloidal quantum dot detector module and the processor being positioned in the enclosure and a battery that is one of positioned in the enclosure or external to the enclosure.

In some embodiments, the enclosure may be made of material that is capable of withstanding temperature and humidity conditions found in outdoor applications.

Further embodiments of the present inventive concept provide a wearable system for detecting the presence of laser light. The system includes an enclosure configured to be worn on a person; a colloidal quantum dot detector module including a colloidal quantum dot photodetector positioned in the enclosure; and a processor positioned in the enclosure and coupled to the colloidal quantum dot detector module that detects interference patterns generated in the colloidal quantum dot detector module by light illuminating the laser warning system and determines if the light illuminating the laser warning systems is laser light based on a magnitude of interference infringes generated by the light illuminating the laser warning system.

DETAILED DESCRIPTION

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As used herein, the term "optoelectronic device" generally refers to any device that acts as an optical-to-electrical transducer or an electrical-to-optical transducer. Accordingly, the term "optoelectronic device" may refer to, for example, a photovoltaic (PV) device (e.g., a solar cell), a photodetector, a thermovoltaic cell, or electroluminescent (EL) devices such as light-emitting diodes (LEDs) and laser diodes (LDs). In a general sense, EL devices operate in the reverse of PV and photodetector devices. Electrons and holes are injected into the semiconductor region from the respective electrodes under the influence of an applied bias voltage. One of the semiconductor layers is selected for its light-emitting properties rather than light-absorbing properties. Radiative recombination of the injected electrons and holes causes the light emission in this layer. Many of the same types of materials employed in PV and photodetector devices may likewise be employed in EL devices, although layer thicknesses and other parameters must be adapted to achieve the different goal of the EL device.

As used herein, the term "fullerene" refers to the buckminsterfullerene $C_{60}$ as well as other forms of molecular carbon, such as $C_{70}$, $C_{84}$, and similar cage-like carbon structures, and more generally may range from 20 to several hundreds of carbon atoms, i.e., $C_n$ where n is 20 or greater. The fullerene may be functionalized or chemically modified as desired for a specific purpose such as, for example, improving solubility or dispersibility or modifying the electrical properties of the fullerene. The term "fullerene" may also refer to endohedral fullerenes wherein a non-carbon atom or atomic cluster is enclosed in the carbon cage. The term "fullerene" may also refer to fullerene derivatives. A few non-limiting examples of fullerene derivatives are [6,6]-phenyl-$C_{61}$-butyric acid methyl ester (PCBM) and phenyl-$C_{61}$-butyric acid cholesteryl ester (PCBCR). The term "fullerene" may also refer to blends of the previously mentioned forms of fullerenes.

As used herein, the term "quantum dot" or "QD" refers to a semiconductor nanocrystal material in which excitons are confined in all three spatial dimensions, as distinguished from quantum wires (quantum confinement in only two dimensions), quantum wells (quantum confinement in only one dimension), and bulk semiconductors (unconfined). Also, many optical, electrical and chemical properties of the quantum dot may be strongly dependent on its size, and hence such properties may be modified or tuned by controlling its size. A quantum dot may generally be characterized as a particle, the shape of which may be spheroidal, ellipsoidal, or other shape. The "size" of the quantum dot may refer to a dimension characteristic of its shape or an approximation of its shape, and thus may be a diameter, a major axis, a predominant length, etc. The size of a quantum dot is on the order of nanometers, i.e., generally ranging from 1.0-1000 nm, but more typically ranging from 1.0-100 nm, 1.0-20 nm or 1-10 nm. In a plurality or ensemble of quantum dots, the quantum dots may be characterized as having an average size. The size distribution of a plurality of quantum dots may or may not be monodisperse. The quantum dot may have a core-shell configuration, in which the core and the surrounding shell may have distinct compositions. The quantum dot may also include ligands attached to its outer surface or may be functionalized with other chemical moieties for a specific purpose.

Plasma synthesis has evolved to be one of the most popular gas-phase approaches for the production of quantum dots, especially those with covalent bonds. For example, silicon (Si) and germanium (Ge) quantum dots have been synthesized by using nonthermal plasma. The size, shape, surface and composition of quantum dots can all be controlled in nonthermal plasma. Doping that seems quite challenging for quantum dots has also been realized in plasma synthesis. Quantum dots synthesized by plasma are usually in the form of powder, for which surface modification may be carried out. This can lead to excellent dispersion of quantum dots in either organic solvents or water, i.e., colloidal quantum dots. Embodiments of the present inventive concept use colloidal quantum dot films as discussed below.

For purposes of the present disclosure, the spectral ranges or bands of electromagnetic radiation are generally taken as follows, with the understanding that adjacent spectral ranges or bands may be considered to overlap with each other to some degree: ultra-violate (UV) radiation may be considered as falling within the range of about 10-400 nm, although in practical applications (above vacuum) the range is about 200-400 nm. Visible radiation may be considered as falling within the range of about 380-760 nm. Infrared (IR) radiation may be considered as falling within the range of about 750-100,000 nm. IR radiation may also be considered in terms of sub-ranges, examples of which are as follows. Short wave infrared (SWIR) radiation may be considered as falling within the range of about 1,000-3,000 nm. Medium wave infrared (MWIR) radiation may be considered as falling within the range of about 3,000-5,000 nm. Long range infrared (LWIR) radiation may be considered as falling within the range of about 8,000-12,000 nm.

Colloidal quantum dot photodetectors are discussed in, for example, commonly assigned U.S. patent application Ser. No. 17/199,971 filed on Mar. 12, 2021 entitled Colloidal Quantum Dot (CQD) Photodetectors and Related Devices; U.S. Pat. No. 8,729,528 entitled Quantum Dot-Fullerene Junction Optoelectronic Devices; and U.S. Pat. No. 8,742,398 entitled Quantum Dot-Fullerene Junction Based Photodetectors, the contents of which are hereby incorporated herein by reference as if set forth in their entirety. It will be understood that a colloidal quantum dot photodetector can be a photoconductor or a photodiode. A photoconductor is a conductor/resistor that changes in response to light. A photodiode is a diode that changes in response to light. Although embodiments of the present inventive concept are discussed primarily with respect to photodiodes, it will be understood that embodiments of the present inventive concept are not limited thereto.

Quantum dot photodiode/photodetector (QDP) technology is implemented to provide low-cost nanotechnology-enabled photodetectors. In some implementations, the photodetectors may be configured to efficiently detect light with sensitivity spanning a spectral region ranging from about 250-2400 nm. Thus, the photodetectors may be configured as a multispectral device capable of producing images from incident ultraviolet (UV), visible and/or infrared (IR) electromagnetic radiation. In some implementations, the spectral range of sensitivity may extend down to X-ray energies and/or up to IR wavelengths longer than 2400 nm. The photodetectors as taught herein are cost effective, scalable to large-area arrays, and applicable to flexible substrates.

As used herein, "quantum efficiency" (QE) refers to the ratio of incident photons to measured electrons, with the optimal efficiency being substantially 100% for a structure without internal amplification (i.e. gain). "Hermetic" refers to a device that is airtight, sealed and/or watertight.

"Dark current" refers to the electric current flowing in a photoelectric device when there is no incident illumination. In physics and in electronic engineering, dark current is the relatively small electric current that flows through photosensitive devices such as a photomultiplier tube, photodiode, or charge-coupled device even when no photons are entering the device. The dark current generally consists of the charges generated in the detector when no outside radiation is entering the detector. It can be referred to as reverse bias leakage current in non-optical devices and is generally present in all diodes. Physically, one source of dark current in diodes is the random thermal generation of excited electrons and holes within the depletion region of the device.

The rapid and successful commercialization of high-power fiber and semiconductor lasers for industrial applications in recent years has in turn created a challenge for both civilian and military equipment and personnel. High-power continuous-wave and pulsed laser sources can be used offensively to disable or destroy key assets. The situation is driving the requirement for broadband, lightweight, small size, low power, battery-operated, wearable laser detection and alert devices, for deployment in wearable systems for first responders and warfighters.

Offensive laser events are already a serious and growing problem for the commercial aircraft industry. Aiming a laser at an aircraft is a serious safety risk and violates federal law, yet laser strikes on aircraft continue to increase each year. According to the Federal Aviation Administration (FAA), in 2017 the agency received 6,754 reports of laser strikes on aircraft, a 250 percent increase since the FAA started tracking laser strikes in 2010. Many high-powered lasers can completely incapacitate pilots who are trying to fly safely to their destinations and may be carrying hundreds of passengers. Broadband (visible-to-infrared), compact, lightweight laser detection systems in accordance with embodiments discussed herein may provide early warning of offensive laser strikes on aircraft and enable pilots to take evasive actions. As used herein, "broadband" refers to light in the visible to infrared spectrum as defined above.

Similarly, increasing reports of strikes on local law-enforcement aircraft, including helicopters and light aircraft, as well as optical strikes through law-enforcement vehicles, and even strikes on individual law-enforcement officers are on the rise. These each drive the need for low size, weight and power, mountable or wearable, broadband laser detectors to provide early warning of offensive coherent light sources.

Thus, there is a need for portable, low-cost detection systems capable of detecting when a person or an object is being illuminated by a laser. These systems are needed to, for example, provide warnings to people to avoid potential imminent bodily threats and reduce the likelihood of equipment damage. It is well known that exposure to lasers may cause damage to the human body, for example, eyes, and/or sensitive EO/infrared (IR) sensors and systems. Accordingly, some embodiments of the present inventive concept provide laser detection systems utilizing thin-film photodiode array technology, for example, colloidal quantum dot photodiode arrays discussed above.

One of the defining characteristics of laser sources is a phase coherence of emitted photons. As used herein. "phase coherence" refers to a state in which two signals maintain a fixed phase relationship with each other or with a third signal that can serve as a reference for each. Phase coherence is used by detection systems to distinguish a laser source from other non-laser optical sources. For example, coherence detection may be achieved by superposition of optical or optically-generated signals. For example, the phase coherence of incident light may be determined by the autocorrelation of the incident optical signal with itself via optical delay elements. By way of further example, a local oscillator signal may be combined with the output of a photodetector to detect a laser-pulse train contained within an unmodulated optical background. Other architectures for coherence detectors include, for example, Michelson interferometers, Fabry-Perot filters (etalons), Fizeau interferometers, wavelength-dependent beam splitters coupled to matched detectors, Fresnel doubles, Lloyd's prisms, and speckle detection systems. Although these approaches can be effective for coherence detection, conventional commercial systems implementing these various approaches do not generally have the size and cost scalability that is needed for a wearable laser detection and alert system (LDAS).

Accordingly, some embodiments of the present inventive concept address the need for a wearable LDAS by providing an affordable, compact, laser warning system with broadband sensitivity and an ability to discriminate between laser and non-laser light sources under a wide range of background optical conditions. Systems in accordance with embodiments discussed herein use colloidal quantum dot photodiode detector arrays that offer performance, cost, and size-scaling advantages not found in, for example, Indium Gallium Arsenide (InGaAs)-based laser detection systems. In some embodiments, the manufacturing techniques used to fabricate CQD arrays, the CQD sensors can be produced at prices and sizes similar to CMOS image sensors, but with a spectral response spanning the visible to the SWIR. The optical properties of a thin-film stack used to fabricate the colloidal quantum dot photodiodes result in internal reflections that generate interference fringe patterns when illuminated by coherent sources. This can be achieved without the need for external optical phase-delay components. The structure is effectively an etalon cavity that contains a partially absorbing photodetector. These advantages allow manufacture of a small, wearable, broadband LDAS at a cost point that will enable its ubiquitous deployment for defense and civilian laser-warning needs as will be discussed further herein.

As used herein, "wearable" refers to a device that is small enough to be worn or carried on a person. Further, an "etalon" refers to an optical interferometer that consists of two plates made of glass or other materials, separated by a small, fixed distance ("cavity"). A beam of light undergoes multiple reflections between the surfaces of the glass plates. This results in optical transmission (or reflection) that is periodic in wavelength.

Although embodiments of the present inventive concept are discussed herein as "wearable," embodiments are not limited thereto. The same concepts may be used to create much larger detectors if desired.

Figure 1:
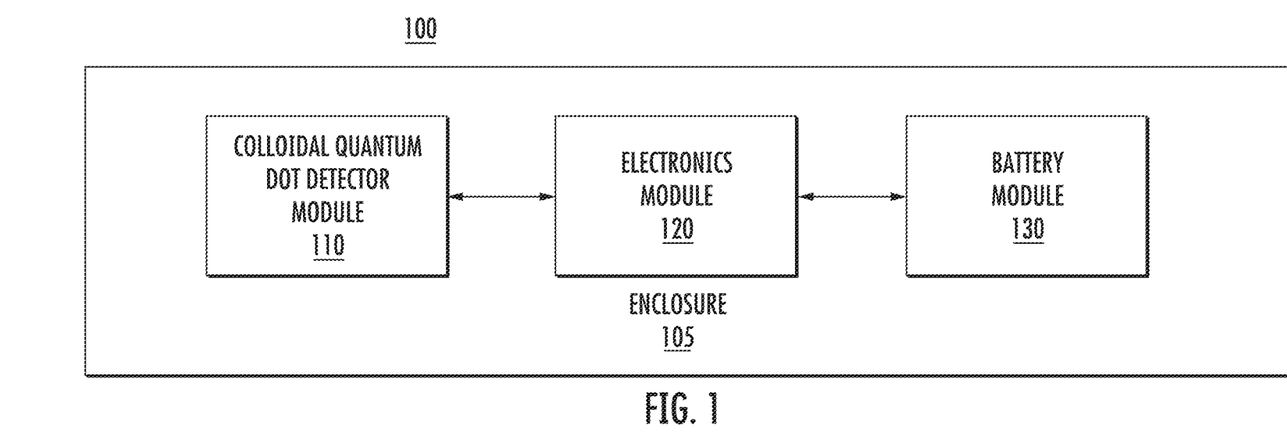
FIG. 1 is a simple block diagram illustrating a wearable laser detection device in accordance with some embodiments of the present inventive concept.

Referring first to FIG. 1, a simple block diagram illustrating a wearable detection system 100, for example, a wearable LDAS, in accordance with some embodiments will be discussed. As illustrated, the wearable detection system 100 includes a colloidal quantum dot detector array module 110, an electronics module 120 and a battery module 130 positioned in an enclosure 105. It will be understood that although the enclosure 105 is shown as housing three modules, embodiments of the present inventive concept are not limited thereto. For example, the battery may be provided outside the enclosure or other modules may be included within the enclosure without departing from the scope of the present inventive concept.

Figure 2A:
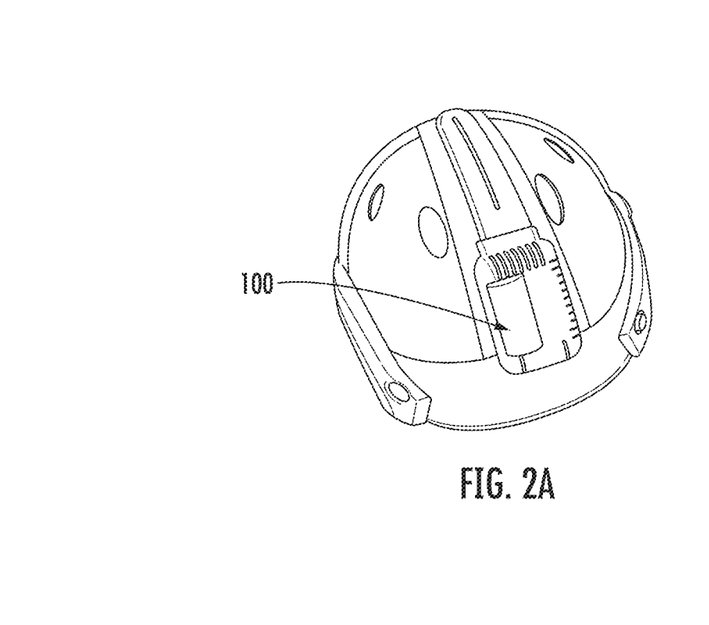
FIGS. 2A and 2B are diagrams showing the wearable laser detection device positioned on a helmet of a user in accordance with some embodiments of the present inventive concept.
Figure 2B:
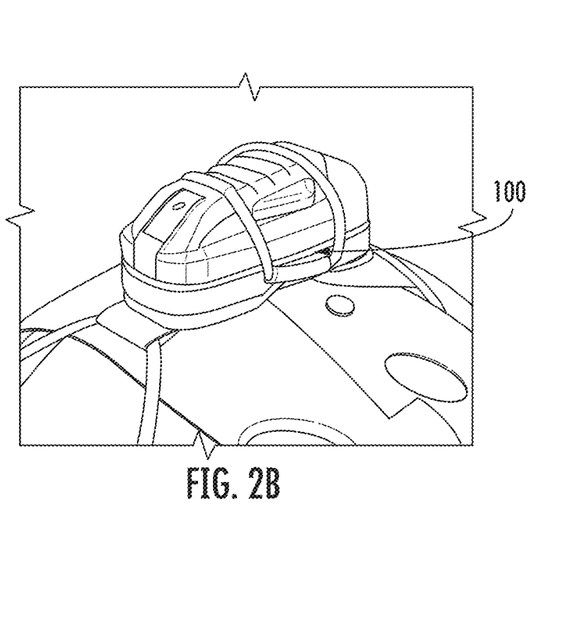

As discussed above, the device 100 is wearable on a person or object. For example, FIGS. 2A and 2B show the LDAS 100 in accordance with embodiments discussed herein affixed to a helmet. However, wearable LDAS devices in accordance with embodiments discussed herein are not limited to being positioned on a helmet. The enclosure 105 may be any material that does not impede the detection operations of the wearable LDAS 100. For example, the enclosure may be made of some combination of metals, polymers, resins, and epoxies. The enclosure allows the wearable LDAS to be the appropriate size and weight, and to meet any environmental requirements, for example, temperature and humidity ranges found in relevant application environments.

Furthermore, the electronics module 120 may include a processor that implements a detection algorithm that detects exposure to possibly harmful laser light sources. As used herein, "laser light sources" refer to coherent light sources such as fiber lasers, semiconductor lasers, gas lasers, and others. In some embodiments, the wearable LDAS 100 detects laser light in the 450-2400 nm spectral range and has the capability for real-time detection of incoming laser radiation in the presence of a complex background. In some embodiments, the system may provide data collection and processing in real time and may operate day or night.

In some embodiments, the colloidal quantum dot detector module 110 may include a two-dimensional (2-D) colloidal quantum dot sensor array. The system 100 including the colloidal quantum dot detector module 110 and a signal processor in the electronics module 120 generates laser-interference fringe patterns. The laser-interference fringe patterns are filtered and identified against background optical noise to detect a "laser illumination event." A laser illumination event refers to detection by the wearable LDAS 100 of laser light. Embodiments of the present inventive concept provide a solid-state solution that results in a simple, compact, and mechanically robust system.

In some embodiments, once the system detects a laser illumination event, it generates some type of warning signal. For example, the warning signal may be an audible signal, a visual signal and the like. The warning signal may be any signal that will alert users that a laser illumination event has occurred may be used without departing from the scope of the present inventive concept.

Figure 3:
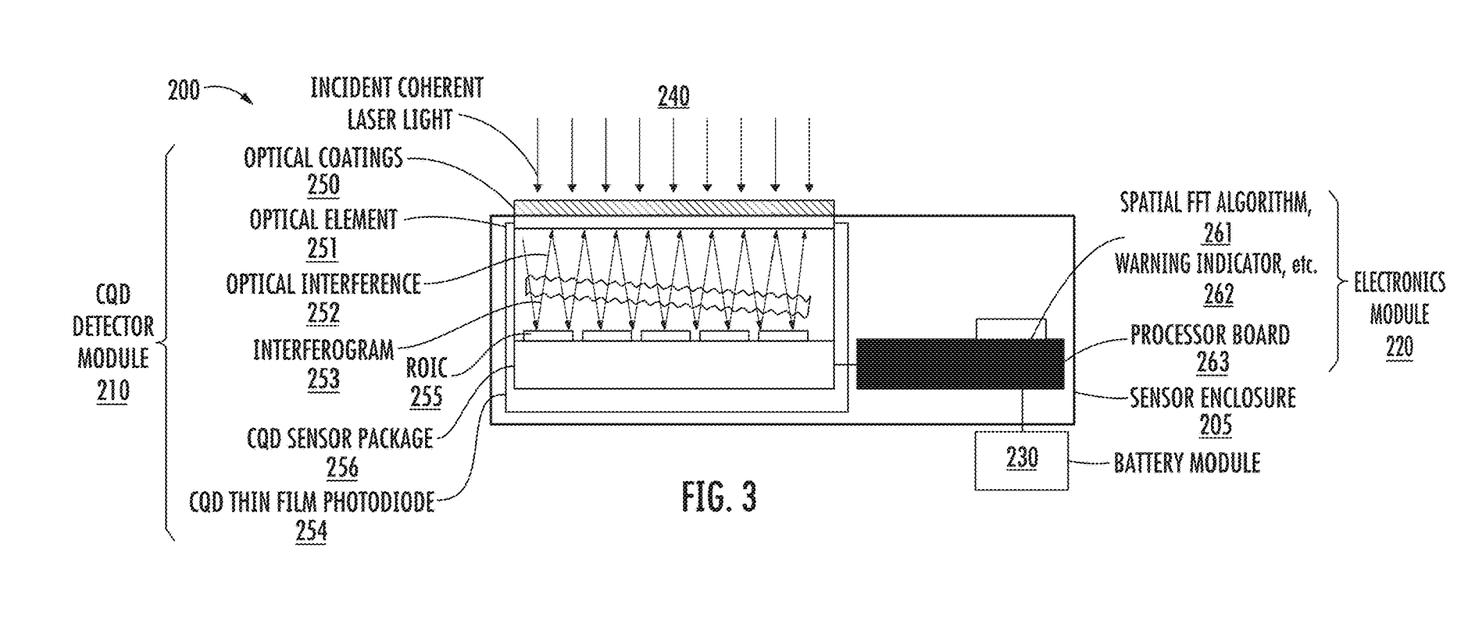
FIG. 3 is a more detailed block diagram illustrating a wearable laser detection device in accordance with some embodiments of the present inventive concept.

Referring now to FIG. 3, a more detailed diagram of the system of FIG. 1 will be discussed. As illustrated, the system still includes an enclosure 205, the colloidal quantum dot detector module 210, the electronics module 220 and the battery 230. The colloidal quantum dot detector module 210 includes optical coatings 250 on an optical element 251, a colloidal quantum dot thin film photodiode 254, a readout integrated circuit 255 and a colloidal quantum dot sensor package 256. As further illustrated, the electronics module 230 includes a processor 263 that illustrates a spatial Fast Fourier Transform (FFT) algorithm 262 in some embodiments.

As illustrated, the colloidal quantum dot detector module 210, the signal processor 263, and detection algorithm implemented by the processor generate laser-interference fringe patterns between the optical elements and the photodiode (cavity). These fringe patterns are filtered and identified against background optical noise. Thus, the incident coherent laser light 240 may be detected by the wearable LDAS 200. It will be understood that the wearable LDAS 200 of FIG. 2 is provided as an example only and embodiments of the present inventive concept are not limited thereto.

In some embodiments, a detector module board and a processor board may be connected by an embedded flex cable. The use of separate boards and flex cables provides the system with some degree of conformality when affixed to curved surfaces such as a helmet shown in FIGS. 2A and 2B. It will be understood that form factors for embodiments of the present inventive concept may vary based on needs of the system. In some embodiments, the system may include lens and optical filter components to provide a 2-Pi steradian field of view (FOV). Once the system detects a laser illumination event, it will generate a warning signal which can be used to drive an audible, visible, or other alarm indicator.

As illustrated in FIG. 2, a thin film colloidal quantum dot photodiode is used to generate laser interference patterns. As illustrated, the system includes as stack of thin film materials with a flat parallel reflective bottom contact and semi-transparent optical absorber. The structure is designed to generate internal reflections that lead to strong interference fringes when illuminated by a coherent source. These reflections occur when photons reflect off the bottom metal pixel electrode and then (partially) reflect again off the top semi-transparent electrode. These reflections lead to constructive and destructive optical interference in the light pattern generated across a 2-D array of pixels.

As discussed above, in some embodiments, thin-film colloidal quantum dot photodiode array technology provides a core portion of the wearable laser detection system in accordance with some embodiments of the present inventive concept. The colloidal quantum dot material is ideally suited to meet the visible-to-SWIR sensitivity requirements of the wearable laser detection device. In particular, colloidal quantum dot material is inherently a broadband absorber with a band-gap that can be tuned across the spectral range from near infrared (NIR) to extended SWIR (eSWIR). Currently, SWIR Vision Systems (SVS) produces cameras with visible (Vis)-SWIR response from 400 to 1700 nm, and has demonstrated a Vis-eSWIR sensitivity camera with response from 350 nm to 2100 nm.

Figure 4A:
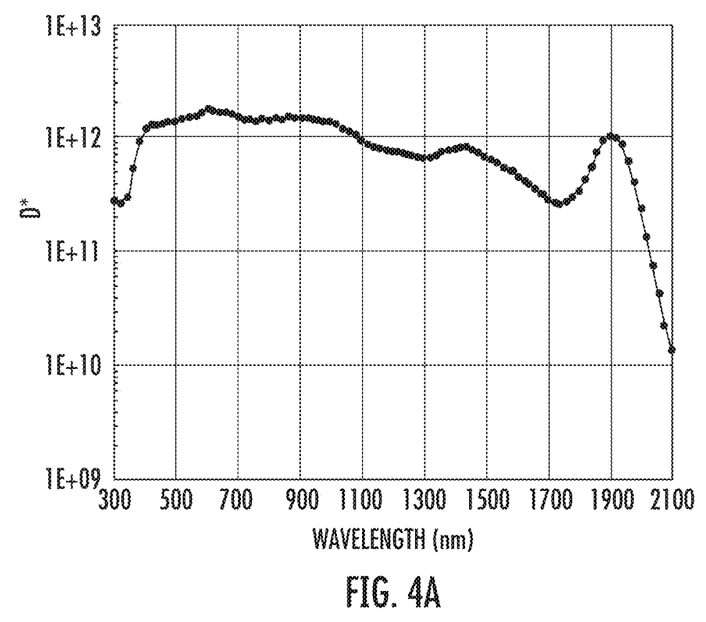
FIG. 4A is a diagram illustrating normalized detectivity measured on a 1920×1080 Acuros e-SWIR CQD detector array.
Figure 4B:
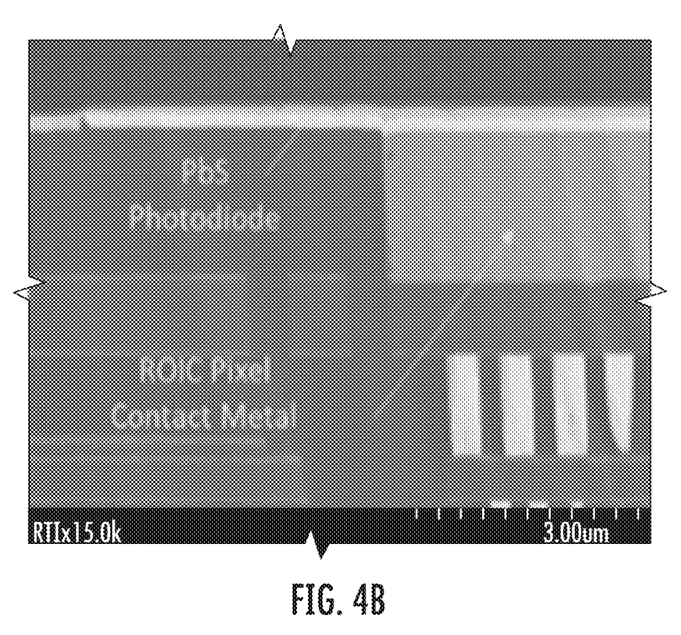
FIG. 4B is a cross section of a colloidal quantum dot PbS photodiode fabricated directly on the surface of a readout integrated circuit.
Figure 4C:
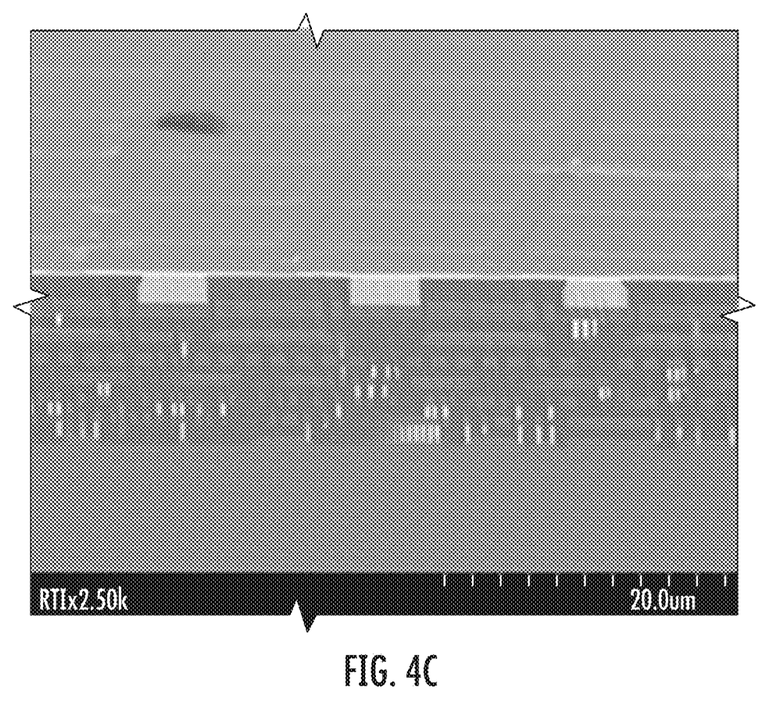
FIG. 4C is an image of the same device of FIG. 4A showing cross section and surface features.

FIG. 4A illustrates the spectral noise-equivalent power (NEP) of a standard SWIR Acuros camera. Images of the monolithically-integrated colloidal quantum dot photodiodes fabricated on the surface of a readout IC and the spectral response of an e-SWIR sensor produced by SVS are shown in FIGS. 4B and 4C, respectively.

The colloidal quantum dot detector technology has an optical power sensitivity well suited for use in the laser detection system. The NEP measurement shown in FIGS. 4A through 4C demonstrates that the sensitivity is sufficient for generating signals well above the background noise of the system. To provide robust detection against high optical background noise (for example sunlight, headlights, etc.), embodiments of the present inventive concept implement algorithms at the processor that indicate the presence of laser-generated interference fringes. The detection of coherent sources against the background and the minimum incident optical power that can be detected are driven by the contrast ratio between the signal intensity of peaks and valleys of the laser interference pattern and the processing algorithm that identifies the presence of fringes. One such processing algorithm is the use of the Fourier transform of the interference pattern data. A Fourier transform of the spatial data can applied to the array of received image data (i.e. the digital image created by the CQD sensor). It will serve to identify and isolate spatial frequencies corresponding to laser-induced interference patterns against a background illumination of non-coherent light.

In some embodiments of the present inventive concept, wavelength of incident laser sources can be determined along with the power density of the incident illumination. Furthermore, embodiments of the present inventive concept may be adapted to include the capability for the determination of the direction of incidence through the use of a multi-aperture or the use of multiple sensor arrays.

Various performance parameters with respect to some embodiments of the present inventive concept will be discussed. However, it will be understood that embodiments of the present inventive concept are not limited to these examples. Some systems in accordance with embodiments of the present inventive concept have a detection threshold of <500 mW/cm$^2$ in presence of background illumination; a wavelength sensitivity of from about 450 nm to about 1600 nm; a field of view of 2 pi steradians.

As discussed above with respect to FIG. 2, a thin film colloidal quantum dot photodiode is used to generate laser interference patterns. As illustrated, the system includes as stack of thin film materials with a flat parallel reflective bottom contact and semi-transparent optical absorber. The structure is designed to generate internal reflections that lead to strong interference fringes when illuminated by a coherent source. These reflections occur when photons reflect off the bottom metal pixel electrode and then (partially) reflect again off the top semi-transparent electrode. These reflections lead to constructive and destructive optical interference in the light pattern generated across a 2-D array of pixels.

Figure 5:
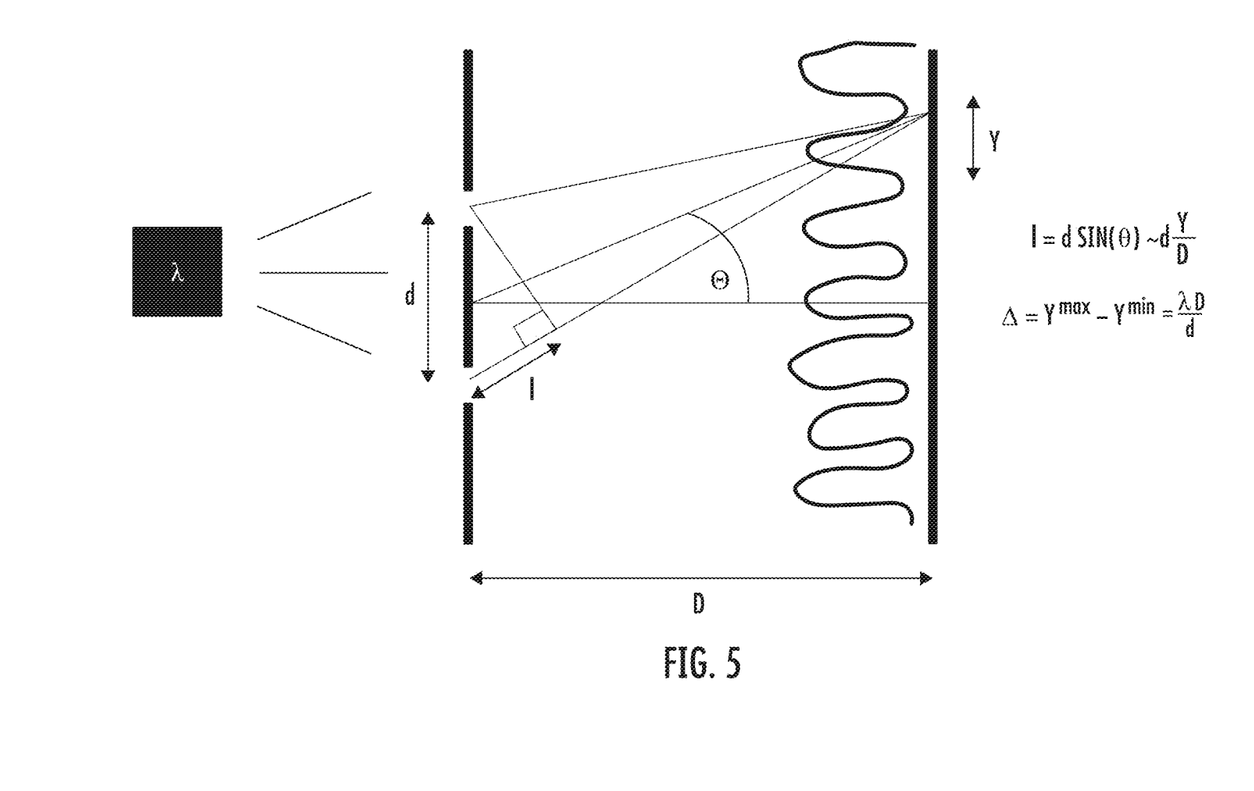
FIG. 5 is a diagram illustrating Young's two slit experiment.
Figure 6A:
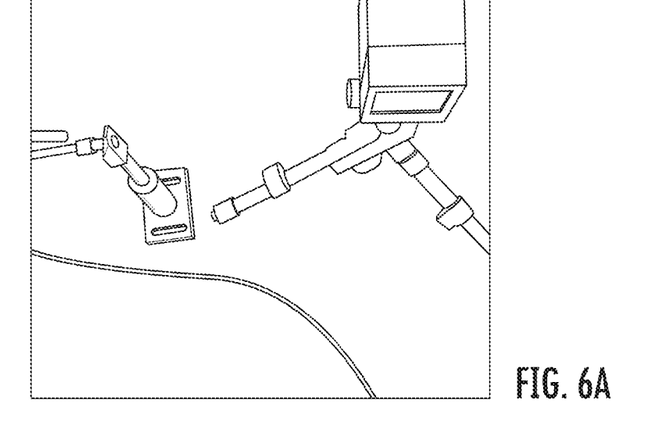
FIG. 6A illustrates an experimental setup showing a 1550 nm laser illuminating an Acuros camera sensor surface from a grazing angle of approx. 5°.
Figure 6B:
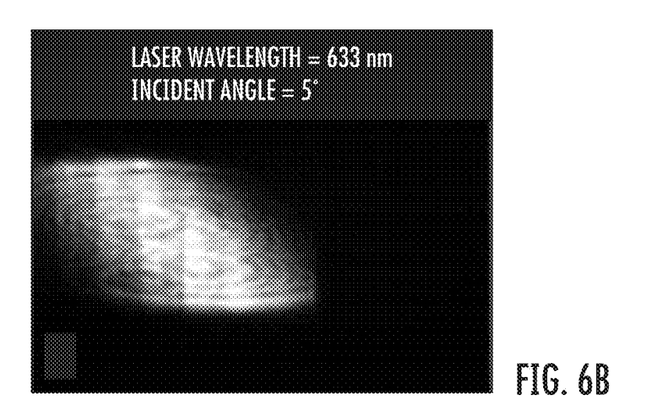
FIG. 6B is an image of a laser spot generated by the illumination of the Acuros camera with a 633 nm laser from a grazing incidence and a spatial Fast Fourier Transform (FFT) of the intensity (FIG. 6C).
Figure 6C:
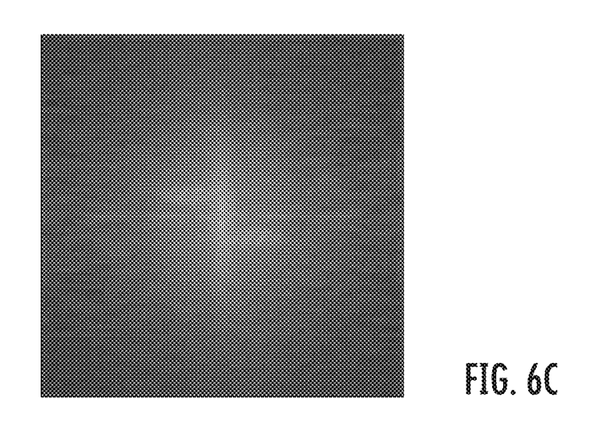
Figure 6D:
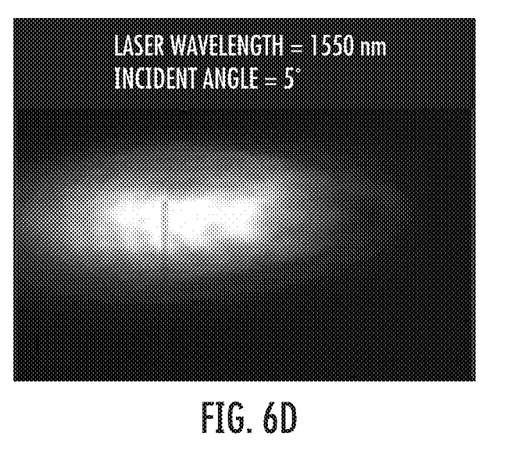
FIGS. 6D and 6E illustrates the same data and FFT analysis but with a 1550 nm laser spot.
Figure 6E:
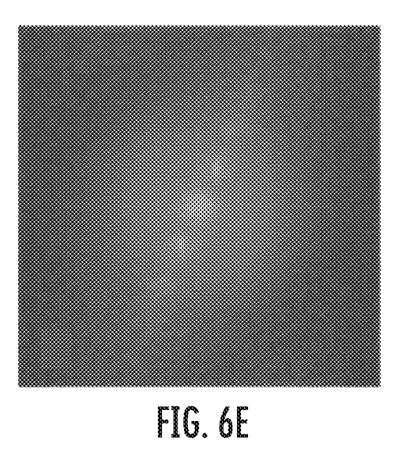
Figure 6F:
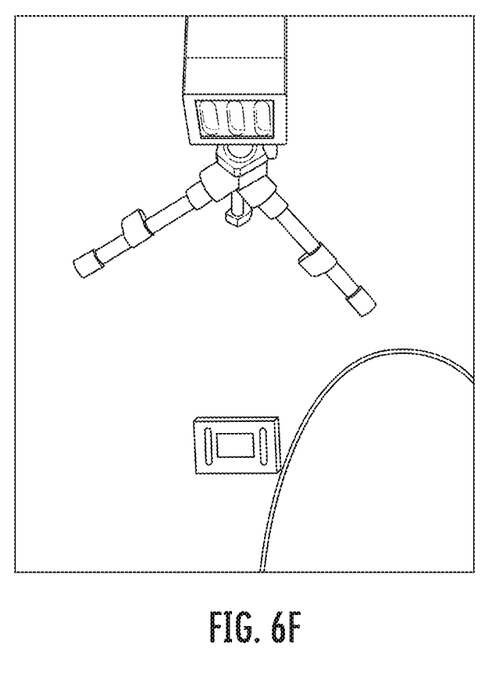
FIG. 6F is an image of the setup with a 1550 nm laser illuminating the sensor from a normal incidence.
Figure 6G:
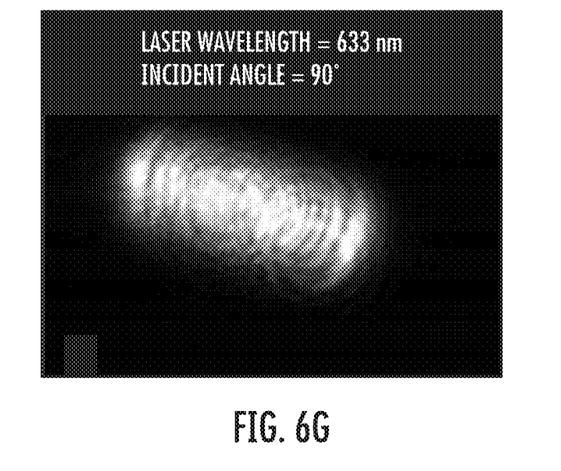
FIGS. 6G and 6H show the laser spot and FFT generated from a 633 nm illumination at normal incidence.
Figure 6H:
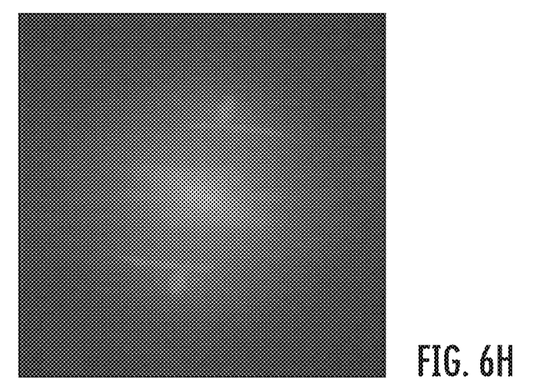
Figure 6I:
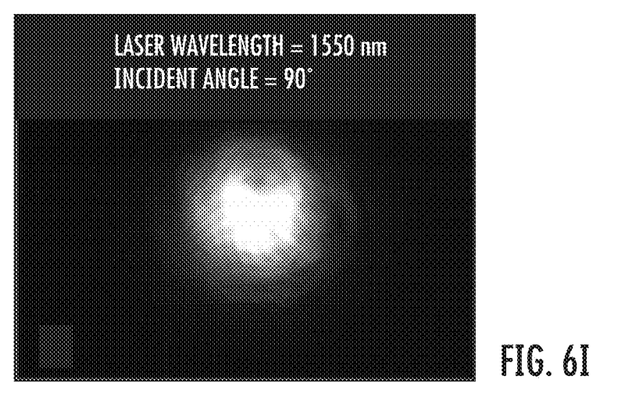
FIGS. 6I and 6J show the laser spot and FFT generated from a 1550 nm laser illumination at normal incidence.
Figure 6J:
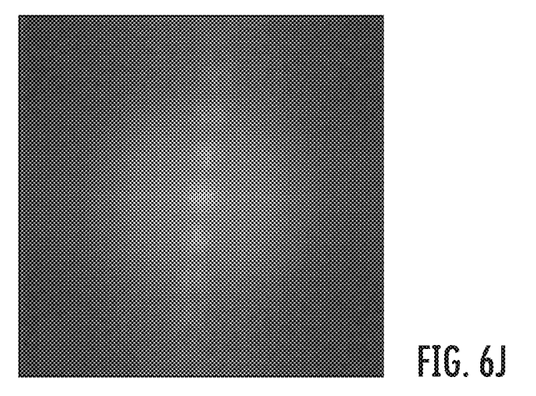

The underlying physics of the optical interference effect can be found in Young's two slit experiment which demonstrates the basic path-length fundamentals of coherent interference. For example, FIG. 5 illustrates this concept. Here the spatial separation of the slits, d, creates the path length difference, l, that gives rise to the constructive and destructive interference present at a distance, D, away from the slits. In similar manner, the interference pattern in the colloidal quantum dot photodiode array is generated by path-length differences between light that absorbed in the colloidal quantum dot layer prior to reflection from the top and bottom contacts and light that is absorbed after being reflected first the bottom, and then the top contact of the photodiode.

Colloidal quantum dot photodiodes in accordance with embodiments discussed herein are built directly on the surface of silicon ROICs to create 2-D imaging arrays. FIGS. 4B and 4C show a SEM image of colloidal quantum dot photodiode arrays monlithically integrated on a ROIC. An example of interference patterns taken using one of SVS's Acuros cameras using 633 nm and 1550 nm laser sources can be seen in FIGS. 6A through 6J. An interference pattern is generated in the sensor array when illuminated by lasers with wavelengths in the Vis-SWIR spectral region. The interference pattern can be enhanced by modifying one or more layers in the device material stack to increase the contrast ratio between the peaks and valleys of the interference fringes. Increasing the contrast ratio of a laser-induced interference pattern will increase the signal-to-noise (SNR) of the system for discriminating incident laser radiation against non-coherent sources. The material stack enhances the strength of the optical interference. As further illustrated, Fourier transforms are applied to the laser image data. This type of analysis can be applied to the imagery to indicate the presence of periodic variations in intensity indicative of interference fringes and forms the basis for the filtering and detection algorithm development.

As briefly discussed above, some embodiments of the present inventive concept provide a lightweight, wearable, laser light detector having an on-board processor. These wearable detectors are able to detect laser light and distinguish between the laser light and other non-laser optical background signals. Accordingly, embodiments of the present inventive concept are able to provide a much need device to protect both people and property. Thus, embodiments of the present inventive concept provide a broadband, compact, wearable laser detection system that has long been needed in the present environment.

Figure 7:
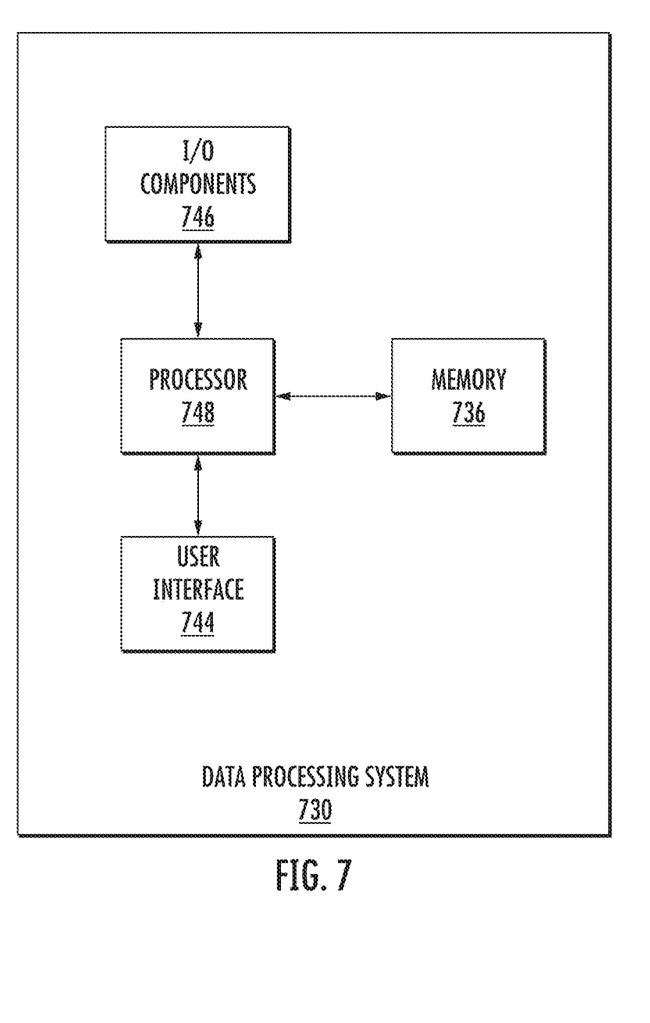
FIG. 7 is a block diagram illustrating a processor in accordance with some embodiments of the present inventive concept.

As is clear from the details of the present inventive concept, embodiments of the present inventive concept require data processing. Referring now to FIG. 7, an example of a data processing system 730 suitable for use with any of the examples described above will be discussed. The data processing system 730 may be part of any component of the system without departing from the scope of the present inventive concept. In some examples, the data processing system 730 can be any suitable computing device for performing operations according to the embodiments discussed herein described herein.

As illustrated, the data processing system 730 includes a processor 748 communicatively coupled to I/O components 746, a user interface 744 and a memory 736. The processor 748 can include one or more commercially available processors, embedded processors, secure processors, microprocessors, dual microprocessors, multi-core processors, other multi-processor architectures, another suitable processing device, or any combination of these. The memory 736, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 730.

I/O components 746 may be used to facilitate wired or wireless connections to devices such as one or more displays, game controllers, keyboards, mice, joysticks, cameras, buttons, speakers, microphones and/or other hardware used to input or output data. Memory 736 represents non-volatile storages such as magnetic, optical, or other storage media included in the data processing system and/or coupled to processor 748.

The user interface 744 may include, for example, a keyboard, keypad, touchpad, voice activation circuit, display or the like and the processor 748 may execute program code or instructions stored in memory 736.

It should be appreciated that data processing system 730 may also include additional processors, additional storage, and a computer-readable medium (not shown). The processor(s) 748 may execute additional computer-executable program instructions stored in memory 736. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

Embodiments of the present inventive concept are described herein with reference to cross-section illustrations that are schematic illustrations of idealized embodiments of the present inventive concept. As such, variations from the shapes of the illustrations as a result, for example, of manufacturing techniques and/or tolerances, are to be expected. Thus, embodiments of the present inventive concept should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the precise shape of a region of a device and are not intended to limit the scope of the present inventive concept.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Furthermore, although various layers, sections and regions of the photodetector may be discussed as being p-type and/or n-type, it is understood by those of skill in the art that in many devices these conductivity types may be switched without effecting the functionality of the device. If an element, region or layer is referred to as "n-type" this means that the element, layer or region has been doped to a certain concentration with n-type dopants, for example, Si, Germanium (Ge) or Oxygen. If an element region or layer is referred to "p-type" this means that the element, region or layer has been doped with p-type dopants, for example, magnesium (Mg), Beryllium (Be), Zinc (Zn), Calcium (Ca) or Carbon (C). In some embodiments, an element, region or layer may be discussed as "p$^+$" or "n$^+$," which refers to a p-type or n-type element, region or layer having a higher doping concentration than the other p-type or n-type elements, regions or layers in the device. Finally, regions may be discussed as being epitaxial regions, implanted regions and the like. Although these regions may include the same material, the layer resulting from the various methods of formation may produce regions with different properties. In other words, an epitaxial grown region may have different properties than an implanted or deposited region of the same material.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

What is claimed is:

1. A laser warning system for providing an alert when exposure to laser light sources is detected, the system comprising:
   a colloidal quantum dot detector module including a colloidal quantum dot photodetector; and
   a processor coupled to the colloidal quantum dot detector module that detects interference patterns generated in the colloidal quantum dot detector module by light illuminating the laser warning system and determines if the light illuminating the laser warning systems is laser light based on a magnitude of interference infringes generated by the light illuminating the laser warning system.

2. The laser warning system of claim 1, wherein the processor is further configured to distinguish the laser light from non-laser background optical conditions.

3. The laser warning system of claim 1, wherein if it is determined that the light illuminating the laser warning system is laser light indicating a laser illumination event, the system is further configured to generate a warning, wherein the warning is an audible alert and/or a visual alert.

4. The laser warning system of claim 1, wherein laser light comprises light having a wavelength of from about 450 to about 2400 nm.

5. The laser warning system of claim 1, wherein the laser warning system further comprises a lens and optical filter components to provide a 2-Pi steradian field of view (FOV).

6. The laser warning system of claim 1, wherein the laser warning system comprises a detection threshold of <500 mW/cm$^2$ in presence of background illumination; a wavelength sensitivity of from about 450 nm to about 2400 nm; a field of view of 2 pi steradians.

7. The laser warning system of claim 1, wherein the system is wearable.

8. The laser warning system of claim 1, wherein the laser warning system further comprises:
- an enclosure, the colloidal quantum dot detector module and the processor being positioned in the enclosure; and
- a battery that is one of positioned in the enclosure or external to the enclosure.

9. The laser warning system of claim 8, wherein the enclosure comprises material that is capable of withstanding temperature and humidity conditions.

10. A wearable system for detecting the presence of laser light, the system comprising:
- an enclosure configured to be worn on a person;
- a colloidal quantum dot detector module including a colloidal quantum dot photodetector positioned in the enclosure; and
- a processor positioned in the enclosure and coupled to the colloidal quantum dot detector module that detects interference patterns generated in the colloidal quantum dot detector module by light illuminating the laser warning system and determines if the light illuminating the laser warning systems is laser light based on a magnitude of interference infringes generated by the light illuminating the laser warning system.

11. The system of claim 10, wherein the processor is further configured to distinguish the laser light from non-laser background optical conditions.

12. The system of claim 10, wherein if it is determined that the light illuminating the system is laser light indicating a laser illumination event, the system is further configured to generate a warning, wherein the warning is an audible alert and/or a visual alert.

13. The system of claim 10, wherein laser light comprises light having a wavelength of from about 450 to about 2400 nm.

14. The system of claim 10, wherein the system further comprises a lens and optical filter components to provide a 2-Pi steradian field of view (FOV).

15. The system of claim 10, wherein the system comprises a detection threshold of <500 mW/cm$^2$ in presence of background illumination; a wavelength sensitivity of from about 450 nm to about 2400 nm; a field of view of 2 pi steradians.

16. The system of claim 10, wherein the system further comprises a battery that is one of positioned in the enclosure or external to the enclosure.

17. The system of claim 16, wherein the enclosure comprises material that is capable of withstanding temperature and humidity conditions.

* * * * *